United States Patent [19]
French

[11] Patent Number: 6,066,941
[45] Date of Patent: May 23, 2000

[54] SWITCHING ALTERNATOR SYSTEM

[75] Inventor: Michael J. French, Kenosha, Wis.

[73] Assignee: Outboard Marine Corporation, Waukegan, Ill.

[21] Appl. No.: 09/113,950

[22] Filed: Jul. 10, 1998

[51] Int. Cl.[7] .................................................. H02P 9/00
[52] U.S. Cl. .............................. 322/90; 322/94; 322/95
[58] Field of Search .............................. 322/90, 95, 96

[56] References Cited

U.S. PATENT DOCUMENTS

| | | | |
|---|---|---|---|
| 3,508,138 | 4/1970 | Schatz | 322/90 |
| 3,710,228 | 1/1973 | Higashino | 322/90 |
| 3,800,197 | 3/1974 | Mehta | 318/93 |
| 3,984,750 | 10/1976 | Pfeffer et al. | 321/16 |
| 4,024,456 | 5/1977 | Sato et al. | 322/29 |
| 4,163,187 | 7/1979 | Thomas | 322/29 |
| 4,175,249 | 11/1979 | Gruber | 323/15 |
| 4,197,492 | 4/1980 | Sato et al. | 322/28 |
| 4,339,704 | 7/1982 | McSparran et al. | 322/90 |
| 4,375,593 | 3/1983 | Winterbotham | 307/37 |
| 4,419,618 | 12/1983 | Gretsch | 322/7 |
| 4,456,870 | 6/1984 | Rodari | 322/29 |
| 4,967,137 | 10/1990 | Canitrot et al. | 322/7 |
| 5,276,603 | 1/1994 | Stanley | 363/43 |
| 5,500,052 | 3/1996 | Horiuchi et al. | 136/244 |
| 5,625,276 | 4/1997 | Scott et al. | 322/24 |
| 5,859,525 | 1/1999 | Minks | 322/94 |

*Primary Examiner*—Thomas M. Dougherty
*Assistant Examiner*—Peter Medley
*Attorney, Agent, or Firm*—Fletcher, Yoder & Van Someren

[57] ABSTRACT

A method and apparatus for controlling AC power from the stator of an alternator in which groups of windings have various numbers of turns and various numbers of poles per winding can be connected in series to achieve optimum power generation at one RPM and in parallel to achieve optimum power generation at another RPM.

14 Claims, 5 Drawing Sheets

SWITCHING ALTERNATOR SYSTEM

BACKGROUND OF THE INVENTION

1. Field of the Invention

The present invention relates in general to alternators and in particular to alternators for use in power generators for vehicles.

2. Description of Related Art Including Information Disclosed Under 37 CFR 1.97 and 1.98

It is well known in the art that the magnitude of the current that can be supplied by an alternator when the speed of rotation of the engine, and hence of the alternator rotor, is very high, is limited by the number of turns of the winding. At high speeds of rotation, in order for an alternator to be able to supply a very high current, it is necessary only that the induction winding of the alternator to be made with few turns. However, at low speeds, in order to obtain sufficient current, it is necessary for the winding to have many turns.

Figure 8:
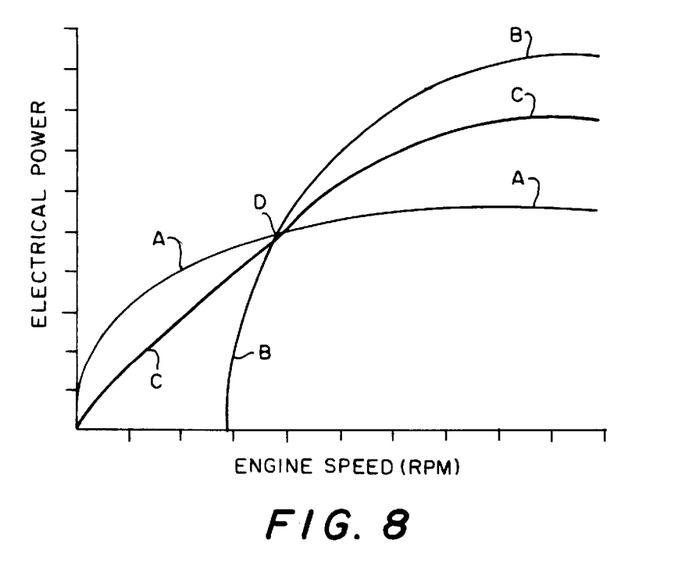
FIG. 8 is a graph illustrating the power output of the alternator as a function of the series or parallel connections.

Thus, in order to provide alternators that are capable of supplying large currents at high running speeds and at the same time currents of a satisfactory magnitude at low running speeds, the alternator induction windings are subdivided into two or more windings intended for a connection in series with each other at low running speeds and in parallel with each other at other higher speeds. Thus, as can be seen in FIG. 8 of the drawings herein, at low speeds where a large power is required, the generator produces an output essentially as shown by the portion of curve A that is greater than the power requirements shown in curve C. When the rate of rotation of the engine of the vehicle exceeds some predetermined value, the windings of the alternator are now connected in parallel with each other and are equivalent to a single winding with a smaller number of turns compared to the series connection. Under these conditions, the supply of current and power by the alternator is essentially that shown by the second part of the characteristic curve B illustrated in FIG. 8. Again, the supply is greater than the power requirements shown in that range by curve C.

Such a system is shown in U.S. Pat. No. 4,339,704 wherein a first leg of six serially-connected diodes are coupled in parallel with a second leg of six series-coupled diodes between a DC bus having a positive and a negative terminal. There is a first junction between the first and second serially-connected diodes in both the first and second legs, a second junction between the second and third diodes in both of the parallel legs, a third junction between the third and fourth diodes in both parallel legs, a fourth junction between the fourth and fifth diodes in both parallel legs, and a fifth junction between the fifth and sixth diodes in both parallel legs.

Figure 1:
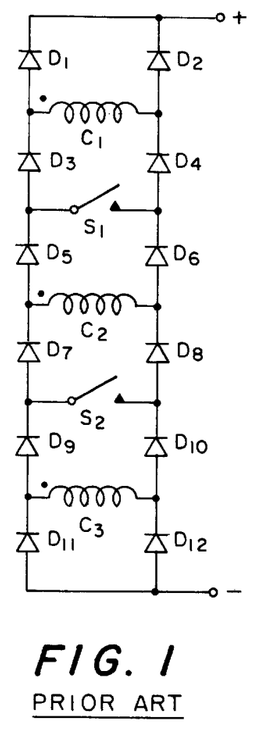
FIG. 1, already described, is a circuit diagram of a switching system of the prior art.

A first coil, C1, from an alternator is connected across the first junction of both parallel legs. A first switch, S1, that can be opened and closed is connected between the second junction of the first and second parallel legs. A second coil, C2, of the alternator is connected between the third junction of both of the parallel legs. A second switch, S2, is coupled between the fourth junction of each of the parallel legs, and a third coil of the alternator is connected between the fifth junction between both parallel legs. When both switches are opened and all of the alternator coils are poled in the same direction, the coils are simply in parallel and, as can be seen in FIG. 1, twelve diodes are required to couple power between the negative and positive output buses. However, when both switches are closed, the three alternator coils are connected in series between the positive and negative power output buses and six diodes are required for each phase of the current flowing through the alternator coils. These diodes are power diodes and are quite expensive.

Thus, as can be seen in FIG. 1, a first leg containing diodes D1, D3, D5, D7, D9, and D11 are coupled in series between the positive and negative power buses. A second parallel leg having diodes D2, D4, D6, D8, D10, and D12 are also serially connected between the positive and negative output terminals. A first current-generating coil, C1, is coupled between the first junction in both legs between the diodes D1 and D3 and D2 and D4. A first switch, S1, that can be opened and closed is coupled between a second junction between diodes D3 and D5 in one leg and D4 and D6 in the second leg. A second coil, or winding C2, is coupled to the junction between diodes D5 and D7 and D6 and D8. A second switch, S2, is coupled between the junctions of diodes D7 and D9 and diodes D8 and D10. Finally, a third coil, C3, is coupled between the junction in the first leg between diodes D9 and D11 and between diodes D10 and D12 in the second leg.

When switches S1 and S2 are open, the output of the coils, since they are all poled alike, are coupled in parallel through the twelve diodes D1–D12 to the positive and negative terminal buses.

Figure 2:
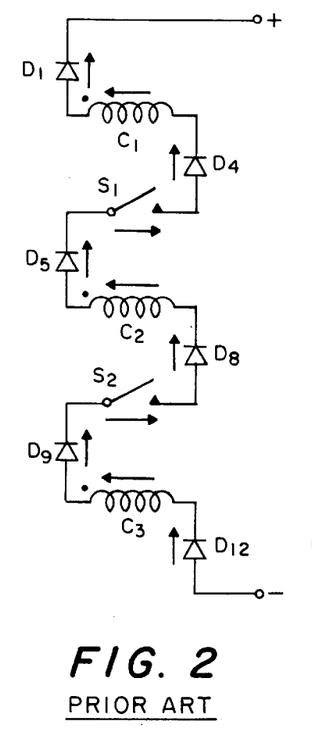
FIG. 2, already described, is a circuit diagram of the prior art illustrating current flow through the coils in a first direction.
Figure 3:
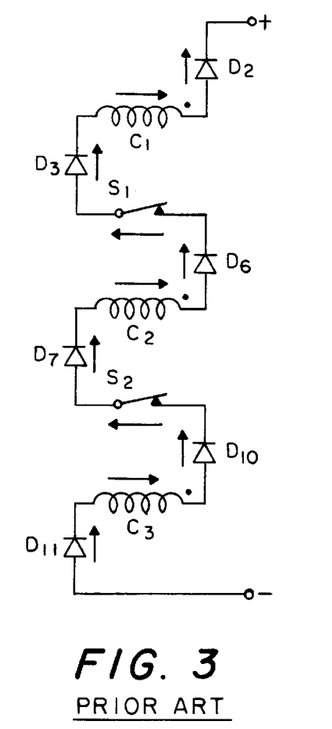
FIG. 3, already described, is a circuit diagram of the prior art illustrating current flow through the coils in a second direction.

However, when the switches are closed to place the three coils in series, as shown in FIGS. 2 and 3, the circuit path is rather circuitous. For instance, in FIG. 2, with the coils poled as shown, the current flows from the negative terminal through D12, coil C3, diode D9, switch S2, diode D8, coil C2, diode D5, switch S1, diode D4, coil C1, and diode D1. Of course, by the current having to travel through all of these six diodes and two switches, not only in great amount of heat generated, but there is a great deal of energy loss in the diodes. During the negative half of the cycle of the coils, when they are poled as shown in FIG. 3, the current flows from the negative DC terminal through D11, coil C3, diode D10, switch S2, diode D7, coil C2, diode D6, switch S1, diode D3, coil C1, and diode D2. Although a different path is taken, it is clear that the current again flows through six diodes and two switches, again creating a considerable energy loss and requiring very expensive diodes to carry the current necessary.

Thus, twelve diodes are required for parallel operation of three alternator coils and six diodes are required for series operation of three alternator coils.

It would be advantageous to have a switching alternator system that could switch the alternator coils from series to parallel with as few diodes as possible.

SUMMARY OF THE INVENTION

The present invention relates to a switching alternator system in which n alternator coils can be connected in series with a maximum of two diodes being used in the series combinations. For the parallel combination, a maximum of 2n diodes are needed for each direction of current flow. Thus for 3 coils, 6 diodes are required for each direction of current flow.

The positive and negative bus bars have 2n parallel legs connected between them. In each leg there is a first and a second series-connected diode. A first alternator winding is connected between the junction of the first and second diodes in the first two legs (a set of parallel legs). A second alternator winding is connected between the junction of the first and second diodes in the third and fourth legs (a second set of parallel legs). The $n^{th}$ coil is connected between the junction of the first and second diodes in the $2n-1$ and $2n$ legs. In this configuration, the coils are in parallel and the current flows through only two diodes in each leg or a total of 2n diodes. By using two legs having two diodes in each leg for each alternator coil, the current can flow in opposite directions through the alternator coil and still flow in the same direction between the positive and negative output terminals.

For two coils or windings, a first switch, conductive in one direction only, is connected between adjacent ends of the first and second coils so that the coils are connected in series when they are poled in a first direction. Thus, the current then flows through a first diode, the first coil, the switch, the second coil, and a second diode to the positive terminal.

By connecting a second switch in parallel with the first, except conducting only in the opposite direction, current reversal on the windings can be accommodated and the current will still flow through only two diodes, the two coils, and the switch. The switches may be thyristors that can be triggered in a well-known manner such as with an electronic control module (ECM) that monitors the rotational speed of the alternator rotor. Below a predetermined rotational speed of the rotor, the switches are closed and the output power of the alternator coils is as shown in waveform A of FIG. 8. When the rotor of the alternator exceeds the predetermined rotational speed, the switches are opened and the coils are placed in parallel with each other, thus producing a power output as shown in waveform B of FIG. 8. A third switch can be coupled between the junction of the first and second diodes and ground or the negative terminal and a fourth switch can be placed between the junction of the 2n−1 and 2n diodes to ground to regulate the output voltage. This is done by shunting (shorting) the current to ground by the appropriate third or fourth switch. Thus if the appropriate one of the first and second switches is switched ON at the same time as the appropriate one of the third and fourth switches, then the current is reduced. Resistance in the series windings limits the current shunted through switches S3 and S4. This allows the designer to use smaller parts and generate less heat on the circuit board.

Thus, it is an object of the present invention to provide a switching alternator that enables the alternator to produce a given output power up to a particular RPM and then the windings are switched from a series connection to a parallel connection to develop a greater power with less current through each winding.

It is another object of the present invention to provide a switching alternator system that utilizes n coils and only two conducting diodes in the series connection of the coils for each direction of current flow and only 2n diodes in the parallel connection for each direction of current flow, thus reducing power dissipation and cost of the system.

It is yet another object of the present invention to provide voltage regulation by shunting currents to ground as needed.

Thus the present invention relates to a switching alternator system comprising first and second DC load buses providing positive and negative voltage output terminals, a rotatable alternator having n alternator coils for generating an AC voltage and a current flow alternating in first and second directions in the coils, first and second ends on each of the alternator coils, diode coupling means connecting the first and second ends of each of said alternator coils directly to both said first and second DC load buses for enabling a current flow in either direction in said alternator coils to flow in the same direction between the first DC load bus and the second DC load bus, and switch means between each two adjacent alternator coils having a first closed portion for selectively and directly connection the n alternator coils to each other in electrical series to supply a first current to the first and second DC load buses and the switch means having a second open position for causing the adjacent alternator coils to be coupled directly to the DC load buses in parallel to supply a second different current to the first and second DC load buses.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENTS

Figure 4:
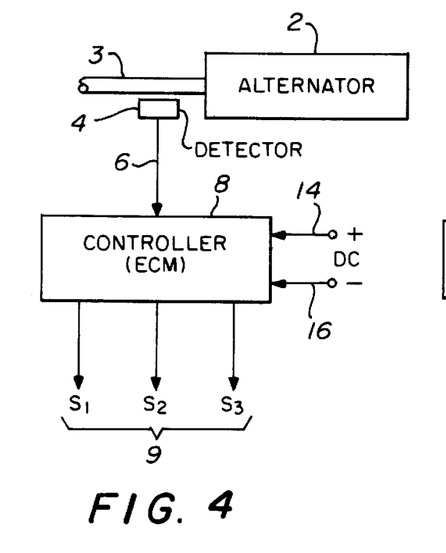
FIG. 4 is a generalized block diagram of the controller of the present invention for detecting alternator rotor speeds and generating switch controlling output signals.

FIG. 4 is a generalized block diagram of the controller 8 of the present invention for detecting alternator rotor speeds and generating switch controlling output signals. The alternator 2 has a rotating shaft 3 the speed of which can be determined by a detector 4 that generates a signal on line 6 to the controller 8 to indicate to the controller 8 the RPM of the alternator 2. The controller 8 can then generate output signals on lines 9 to control the various switches of the switching circuit to produce a desired output voltage and current. The controller 8 is also coupled to DC bus bars 14 and 16.

Figure 5:
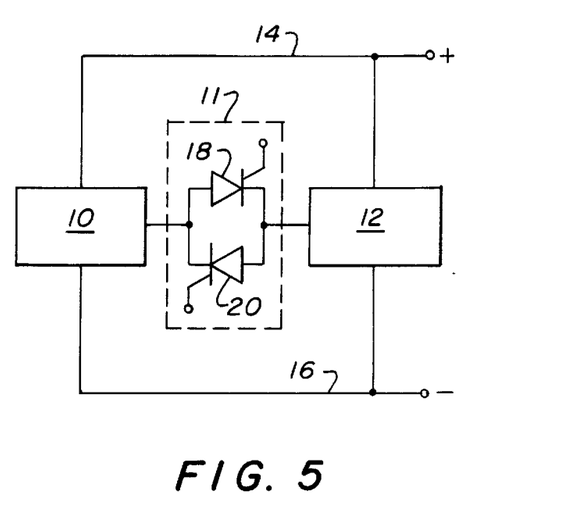
FIG. 5 is a generalized block diagram of two stages of the present invention with a switching circuit connecting the first and second generating coils to place them in series or in parallel.

FIG. 5 illustrates a generalized block diagram of the present invention with two stages or circuits 10 and 12 that include first and second coils of an alternator that can be coupled in series or parallel by a switch means 11 that includes two switches 18 and 20 that conduct in opposite directions of current flow. Switches 18 and 20 are shown to be power-conducting switches such as thyristors.

The electrical power system used for the circuit of FIG. 5 consists of three basis components: the alternator stator 2, the shaft or flywheel 3, and the electronics 8 that control the power regulator. The magnets in the rotating flywheel induce flux in the stator laminations in a well-known manner. This flux induces a voltage in the windings or coils and current flows to the regulator which delivers it to the load. This is typical for a permanent magnet alternator.

Figure 6:
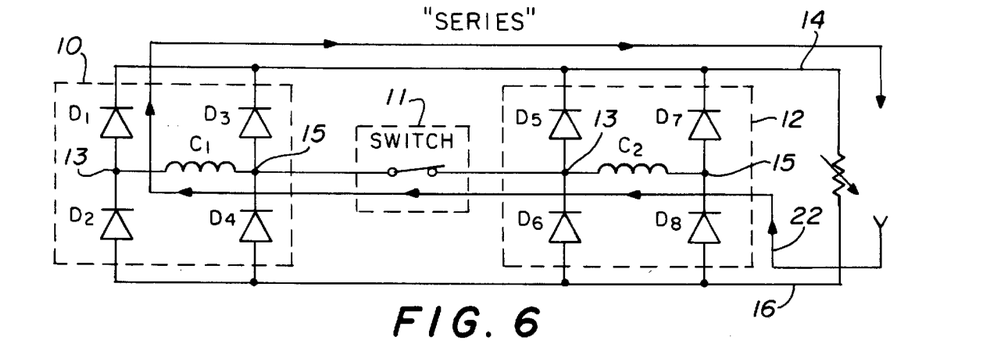
FIG. 6 is a detailed circuit diagram of the generalized block diagram of FIG. 5 with the current flowing through the coils in a first direction and with the alternator coils in series.

The system of FIG. 5 utilizes a unique method and apparatus for controlling the AC power from the stator. The stator is divided into sets of windings with various numbers of turns and various numbers of poles per winding as in well known. For simplicity, assume that there are two sets of windings 10 and 12 in FIG. 5 (two separate AC voltage sources) that have the same phasing. They are shown as blocks 10 and 12 in FIG. 5 and as windings 1 and 2 in FIGS. 6 and 7. At low engine speeds the windings are connected in series to achieve optimum power generation as shown in FIG. 6. Power flows from the negative bus 16 (as indicated by line 22) through diode D8, winding or coil C2, closed switch 11, winding or coil C1, and diode D1 to the positive bus bar 14. This is the current for half-cycle. For the opposite half-cycle, the current would flow through diode D2 from negative bus 16, through winding C1, switch 11, winding C2, and diode D7 to the positive bus bar 14.

Figure 7:
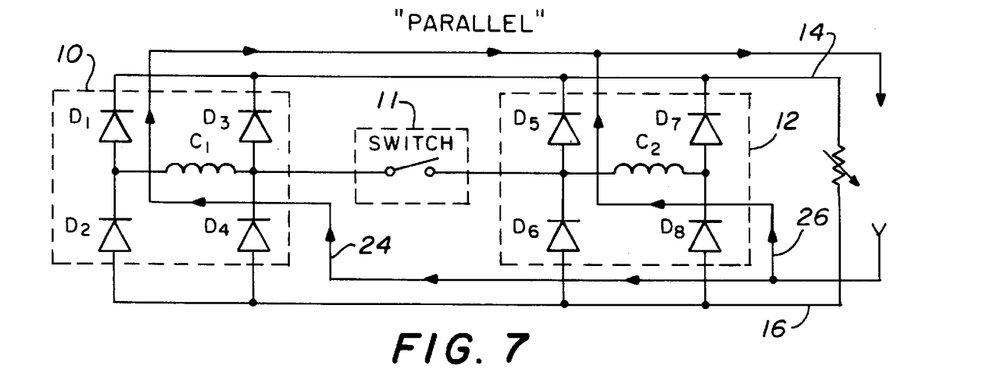
FIG. 7 is a detailed circuit diagram of the generalized block diagram of FIG. 5 when the current is flowing through the coils in a first direction and the coils are in parallel.

As the engine speed increases, it is desirable to connect the windings in parallel to achieve optimum power generation as discussed previously in relation to FIG. 8. This is done by opening switch 11 as illustrated in FIG. 7. Since the overall winding resistance is less than the windings in parallel, more current is allowed to flow to the load. Thus, as can be seen, the current follows two parallel paths in FIG. 7 between the negative bus bar 16 and positive bus bar 14. The current flows from the negative bus 16 (along line 24) through diode D4, winding or coil C1, and diode D1 back to the positive bus 14. In like manner, in the circuit 12, the current flows (as indicated by line 26) through diode D8, winding C2, and diode D5 to the positive bus 14.

Again, for the reverse poled operation, the second half-cycle, current flows from the negative bus 16 through diode D2 in circuit 10, through winding C1 and through diode D3 to positive bus 14. In circuit 12, the current would flow from a negative bus 16 through diode D6, winding C2, and diode D7 to positive bus 14.

Again, considering FIG. 8, there can be seen the graphical representation of why stator windings must be switched from series to parallel. Curve C illustrates the electrical power requirements for operating the engine (i.e., fuel injectors, ignition, and ECM). Notice that this curve increases almost linearly with engine speed until some maximum is reached. The series connected winding A supplies sufficient current until the windings become saturated. At that point D, the windings must be switched to the parallel configuration as shown by curve B to meet the electrical power requirements shown in curve C.

Figure 9:
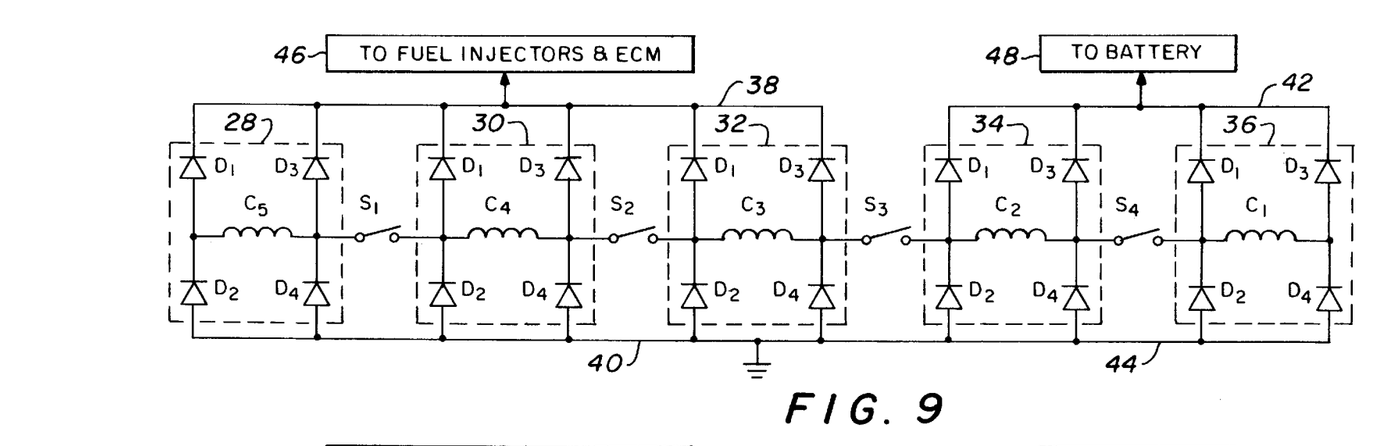
FIG. 9 is a circuit diagram of five alternator coils in two groups, one group coupling current to a battery in parallel and the other group coupling current to the fuel injectors and the ECM in parallel.

Now that a basic explanation of the operating theory is completed, the schematic for the actual system can be discussed. This system consists of n windings on the stator that can be connected in series or parallel. In the example illustrated in FIG. 9, n=5. As can be seen in FIG. 9, there is a first DC load bus having a positive terminal 38 and a negative terminal 40 and a second separate DC load bus having a positive terminal 42 and a negative terminal 44 that is common with terminal 40. A first group of x alternator coils, where x=3, is connected to the first DC bus with terminals 38 and 40. The first group of alternator coils consists of coil windings C3, C4, and C5 in circuits 28, 30, and 32. A second group of n-x alternator coils are connected to the second separate DC load bus having terminals 42 and 44. Thus circuits 34 and 36 contain coils C1 and C2 of the alternator. The first group of alternator coils provides power to the fuel injectors and ECM unit 46, while the second group of n-x alternator windings or coils provides power to the battery 48 as is shown. Each of the circuits 28, 30, 32, 34, and 36 includes one of the n alternator coils or windings where n=5. Since x coils, where x=3, are connected to circuits 46, the remaining circuits n-x, 5-3=2, coils or windings C1 and C2, are parts of circuits 34 and 36. Thus, the first group of windings is used to control power for the ECM and the fuel injectors and the second group is used to control power for battery charging. In the example shown in FIG. 9, windings C1 and C2 in the second group generate power for the battery charging and windings C3, C4, and C5 in the first group, generate power for the ECM and the fuel injectors.

It will be recalled that each of the switches 1–4 is equivalent to the switch 11 shown in FIG. 5. That is, it has a first thyristor for conducting in one direction and a second thyristor for conducting in the other direction. This allows current to flow in both directions through each of the alternator windings. However, for simplicity, the switches will be illustrated as a single switch as shown.

Figure 10:
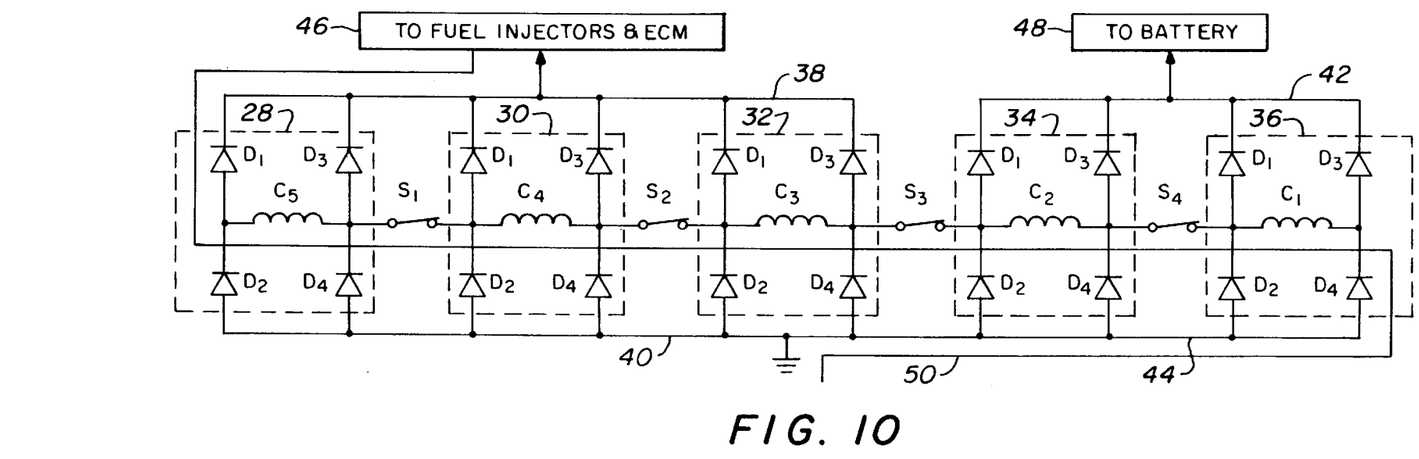
FIG. 10 is a detailed circuit diagram the circuit of FIG. 9 when the five alternator coils are connected in series by means of a switch arrangement with the current flowing in a first direction.

During engine starting all five windings are connected in series as illustrated in FIG. 10 by closing switches S1, S2, S3, and S4. Utilizing the entire stator for starting maximizes the power generated for the ECM and fuel injectors. Also, the dependence on the battery for power is not necessary. This configuration is illustrated in FIG. 10 wherein all the switches are illustrated as closed and the current follows the path indicated by line 50 between the common ground 40, 44 and load 46.

Figure 11:
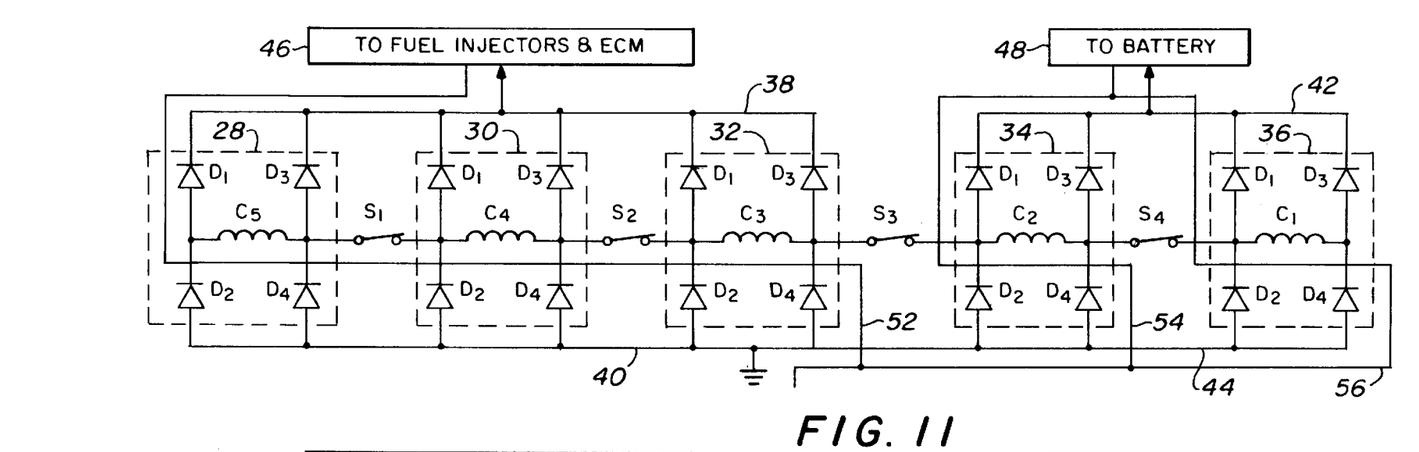
FIG. 11 is a circuit similar to FIG. 10 except showing the current flowing in series to a first load, the ECM, and separately in parallel to a different load, the battery.

Once the engine has started and reaches approximately 500 RPM as detected by the controller 8 in FIG. 4 from the signal generated by detector 4 on line 6, switch 3 is opened as illustrated in FIG. 11 and the first group of alternator windings or coils S28, S30 and S32 are now isolated from the second group of alternator windings in circuits 34 and 36. The two regulation systems or groups are now isolated because of switch S3 being open or non-conductive. Switch S4 in the second group may be opened at various speeds as needed depending upon the current requirements. Thus, in the first group of alternator windings or coils, the current flows as indicated by path 52 from the ground bus 40 through diode D4 of circuit 32, winding C3, switch S2, winding C4, switch S1, winding C5, and diode D1 of circuit 28 to the positive bus 38.

In the second group, switch 4 is shown open, in which case current flows through two parallel paths to the battery 48. In the first path it flows along path 54 through diode D4 of circuit 34, coil 2, and diode D1 of circuit 34 to the positive bus 42 and the battery 48. The second parallel circuit has the current flowing along path 58 through diode D4 of circuit 36, winding C1, and diode D1 of circuit 36 to the positive bus 42 and the battery 48. Of course, on the negative half-cycle of the generated voltage, the current flows through the winding in the opposite direction as explained earlier.

Figure 12:
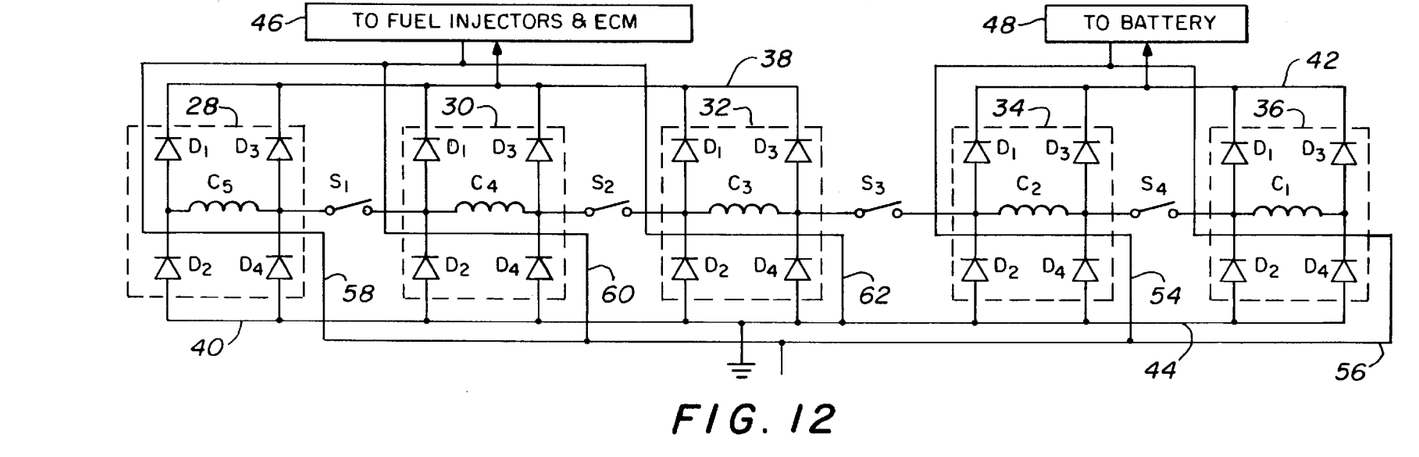
FIG. 12 is a circuit similar to FIG. 10 except showing the current flowing in parallel separately to two different loads.

As previously discussed, an increase in engine speed will require the first group of windings C3, C4, and C5 to be connected in parallel in order to optimize power generation. This system requires switches S1 and S2 to open at approximately 3300 RPM. This circuit is illustrated in FIG. 12. Thus in FIG. 12, all three windings in group 1 (windings C3, C4, and C5) are coupled in parallel to each other to the positive bus 38 because switches S1 and S2 are open. Thus, the current follows a first path from the negative bus 40 along path 58 through diode D4 of circuit 28, alternator winding or coil C5, and diode D1 of circuit 28 to the positive bus 38. In like manner, the current flows along paths 60 and 62 through circuits 30 and 32 having windings C3 and C4. The second group of windings 34 and 36 operate as discussed with relation to FIG. 11.

Figure 13:
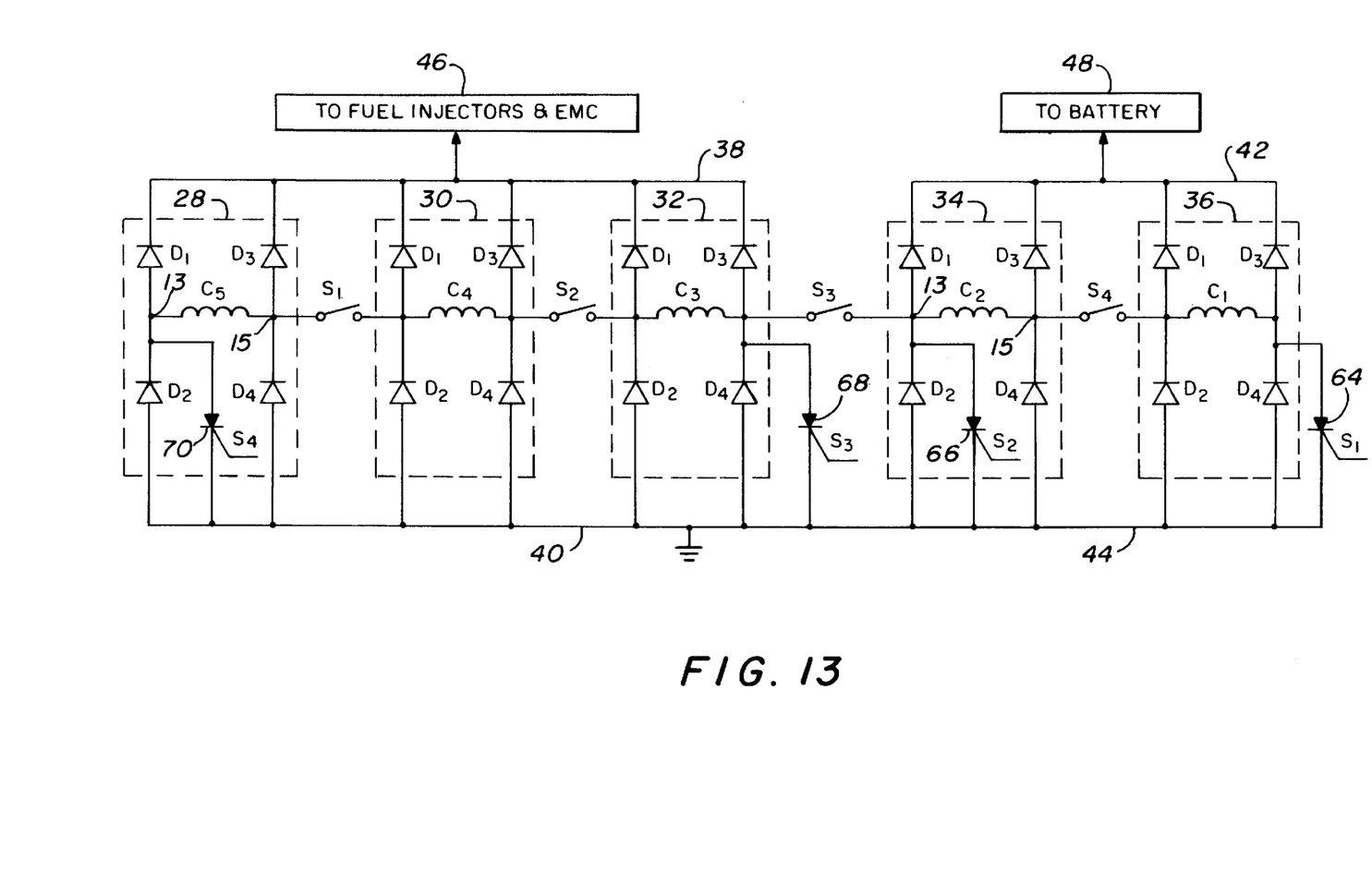
FIG. 13 is a circuit diagram of the coils of FIG. 12 connected in parallel with switches coupled thereto for regulating the voltage output.

Voltage regulation of the above circuit is accomplished by using thyristors in a shunting configuration. This is shown in FIG. 13. The power from windings C1 and C2 is regulated by switches 64 and 66 by shunting (shorting) the current to the ground bus 44. This technique regulates the voltage to the battery. Switches 64 and 66 are controlled by the ECM 8 shown in FIG. 4. In a similar manner, switches 68 and 70 are used to shunt power for windings C3, C4, and C5. The voltage is regulated for the ECM and fuel injectors. During battery voltage regulation, the windings C1 and C2 in circuits 34 and 36 are connected in series. This is done to reduce peak currents and part counts. The same technique is used during regulation for the ECM and fuel injector windings.

Clearly, n alternator coils or windings could be utilized. They can be divided into two groups, x and n-x coils, as explained previously where, for example only, n=5, x=3, and n-x=2.

It will be noted in each of the circuits in FIGS. 6, 7, and 9–13, that diode means connects the first and second ends of each of the coils directly to both the first and second DC load buses for enabling a current flow in either direction in the alternator coil and yet allow the current in the load to flow in the same direction continually. Switch means, one of switches S1–S5, is located between each two adjacent coils having a first closed position for selectively and directly connecting the n alternator coils to each other in electrical series to supply a first current to the first and second DC load buses and a second open position for causing the adjacent alternator coils to be coupled directly to the DC load buses in parallel to supply a second different current to the first and second DC load buses.

It will also be noted that the diode means comprises n parallel pair of first and second serially-connected diode sets D1, D2 and D3, D4, connected between the positive and negative DC buses. Each of the n alternator coils is connected between junctions 13, 15 of corresponding parallel pairs of the first and second serially-connected diodes as can be seen in any of the FIGS. 6, 7, and 9–13. In this manner, the alternating current flowing in different directions in the alternator coils always flows in the same direction between the first and second load buses to create DC current.

Further, the switches, as stated previously, are power switches such as thyristors. Thus, in FIG. 5, switch 11 has two thyristors 18 and 20. Thyristor 18, selectively operable between open and closed positions, is connected between opposite ends of electrically adjacent (not necessarily physically adjacent) alternator coils in circuits 10 and 12 and conducts current in one direction from coil circuit 10 to coil circuit 12 while parallel thyristor 20 couples current in the other direction from coil circuit 12 to coil circuit 10. When both thyristors are non-conductive, the switch is open. Thus, the two switches 18 and 20 are conductive in opposite directions to accommodate the current generated in the alternator coils in opposite directions.

The controller 8 shown in FIG. 4 is a control means that detects the speed of rotation of the alternator rotor 3 in any well-known manner such as by detector 4 and closes the switches such as switch 11 to serially connect the n alternator coils up to a first rotational speed of the alternator for opening the switches 11 to parallel connect the n alternator coils at alternator rotational speeds higher than the first rotational speed.

FIG. 9 illustrates the alternator coils being divided into a first group of x coils connected to a first DC load bus and a second group of n-x alternator coils being connected to a second separate load bus. As can be seen in FIG. 9, first diode means D1, D2 and D3, D4 in each of the circuits directly connects the first and second ends of each of the x alternator coils of the first group to the first DC load bus 38 and 40 for enabling a current flow in either direction in each of the x stator coils to flow between the positive and negative terminals in the same direction. Likewise, second diode means D1, D2 and D3, D4 of circuits 34 and 36 directly connect the first and second ends of each of the second group of n-x alternator coils to the second separate DC load bus 42, 44 for enabling a current flow in either direction in each of the n-x alternator coils to flow between the second positive terminal 42 and the common terminal 44 in the same direction.

A first switch S3 is coupled between the first and second groups of alternator coils as can be seen in FIG. 9. The first switch S3 has a first closed position as shown in FIG. 10 for coupling the first and second groups of alternator coils in series and a second open position as shown in FIG. 11 for coupling the first group of alternator coils to the first DC load bus 38, 40 and the second group of alternator coils to the second DC load bus 42, 44 in parallel.

Further, as can be seen in FIG. 11, second switches S1 and S2 have a first position for selectively connecting the first group of x alternator coils C3, C4, and C5 to the first DC load bus 38, 40 in series and has a second position as illustrated by FIG. 9 for selectively connecting the first group of x alternator coils to the first DC load bus 38, 40 in parallel.

A third switch S4 has a first position for selectively connecting the second group of n-x alternator coils C1 and C2 to the second separate DC load bus 42, 44 in series as shown in FIG. 10 and a second position for selectively connecting the second group of n-x alternator coils C1 and C2 to the second separate DC load bus 42, 44 in parallel as shown in FIG. 11.

The electronic control module 8 shown in FIG. 4 is connected to the first DC load bus 14 and 16 with a battery 48 connected to the second separate DC bus 42, 44 shown in FIG. 9 for receiving a charging voltage. The RPM detector 4, shown as an example only in FIG. 4, generates a signal representing the rotational speed of the alternator 2. The electronic control module 8 is coupled to the RPM detector 4 and to the first switch, S3, the second switches S1 and S2, and the third switch, S4, to connect all of the n alternator coils C1–C5 in series for supplying a first power to the first DC load bus 38 and 40 as shown in FIG. 10 when the alternator RPM is equal to or less than the first RPM and for opening the first switch S3 in FIG. 10 to connect only the group of x alternator coils to the first DC load bus as shown in FIG. 11 to supply a second different power and to connect the group of n-x alternator coils C1 and C2 to the second separate DC load bus 42, 44 when the alternator RPM is greater than the first RPM but equal to or less than a second RPM.

Further, as can be seen in FIG. 11, the ECM, when opening the first switch, S3, to connect only the n-x alternator coils to the second separate DC load bus 42, 44, selectively opens the third switch, S4, to cause the n-x alternator coils to be coupled to the battery 48 in parallel to obtain a first charging voltage and to selectively close the third switch, S4, to cause the n-x alternator coils to be coupled to the battery in series to obtain a second charging voltage.

As can be seen in FIG. 13, a fourth switch 70 (a thyristor for example) is coupled in parallel between an end of coil C5 of the x alternator coils and the common ground bus 40 under the control of the ECM 8 to selectively conduct current to the common bus bar to regulate the voltage generated by the x alternator coils when the current flows through the x alternator coils in a first direction.

A fifth switch 68 is connected in parallel between an end of an at least another one of the x alternator coils, coil C3, and the common ground bus 40 under the control of the ECM 8 to selectively conduct current to the common bus to regulate the voltage generated by the x alternator coils when the current flow generated by the x alternator coils is in the opposite direction.

Likewise, a sixth switch 64 and the seventh switch 66 regulate the voltage to battery 48.

Thus, there has been disclosed a novel switching system for an alternator in which the windings of the alternator may be connected in series to achieve optimum power generation at one RPM and in parallel to achieve optimum power generation at a second RPM. These windings may be formed in two groups of windings with one group being coupled to a load including fuel injectors and the electronic control unit or module and a second group being coupled to a battery for charging the battery. In each group the coils or windings may be connected in series or in parallel as needed to provide the proper power to the circuits.

The corresponding structures, materials, acts, and equivalents of all means or step plus function elements in the claims below are intended to include any structure, material, or act for performing the function in combination with other claimed elements as specifically claimed.

I claim:

1. A switching alternator system comprising:
   first and second DC load buses providing positive and negative voltage terminals;
   a rotatable alternator having n alternator windings, each winding having first and said second ends, for generating an AC voltage and a current flow alternating in first and second directions between said first and second ends;
   diode means separately connecting each of the first and second ends of each of said n windings directly to both said first and second DC load buses for enabling a current flow in either direction in each alternator winding to flow in the same direction between the first DC load bus and the second DC load bus;
   switch means directly connecting opposite ends of each two electrically adjacent windings and having a first closed position for selectively and directly connecting said n alternator windings to each other in electrical series to supply a first current to the first and second DC load buses;
   said switch means having a second open position for causing each of said alternator windings to be coupled directly to said DC load buses in parallel to supply a second different current to said first and second DC load buses;
   n parallel pair of first and second serially-connected diode sets connected between said positive and negative DC buses;
   a junction between each of said serially-connected first and second diode sets; and
   each of the n alternator windings being connected between the junctions of a corresponding parallel pair of said first and second serially-connected diodes so that the alternating current flowing in different directions in the first and second alternator windings always flows in the same direction between the first and second load buses to create DC current.

2. The switching alternator system of claim 1 wherein said switch means further comprises:
   a first switch, conductive in one direction only and selectively operable between opened and closed positions, connected between opposite ends of electrically adjacent alternator windings to serially connect said n alternator windings to said DC load bus when a first current flows in the first direction through said first and second alternator windings to provide a half-wave rectified voltage; and
   a second switch, conductive only in a direction opposite said first switch and selectively operable between opened and closed positions, connected in parallel with said first switch to serially connect said n alternator windings to said DC load bus when a second current flows in the second direction through said alternator windings to provide a full-wave rectified DC voltage.

3. The switching alternator system of claim 2 wherein said first and second switches are both non-conductive simultaneously to connect said n alternator windings to said DC load bus in parallel.

4. The switching alternator system of claim 2 further comprising:
   a third switch connected between the junction of a first set of said first and second serially-connected diodes and said negative bus bar for selectively conducting current to the negative bus bar to regulate the output voltage when said current flows through said first and second windings is in said first direction; and
   a fourth switch coupled to between the junction of a second set of said first and second serially-connected diodes and said negative bus bar for selectively conducting current to the negative bus bar to regulate the output voltage when the current flow through the first and second series windings is in said second direction.

5. The switching alternator system of claim 4 wherein each of the first, second, third, and fourth switches is a thyristor.

6. The switching alternator system of claim 1 further including:
   control means associated with said alternator for detecting the speed of rotation of said alternator rotor; and
   said control means operating said switch means to serially connect said n alternator windings at alternator rotational speeds up to a first rotational speed of said alternator and for opening said switch means to parallel connect said n alternator windings at alternator rotation speeds higher than said first rotational speed.

7. A switching alternator system for an engine comprising:
   a rotatable alternator having n alternator windings, each winding having first and second ends, for generating an AC voltage and a current flow that alternates in first and second directions between said first and second ends;
   a first DC load bus having positive and negative terminals;
   a second separate DC load bus having a second positive terminal and a negative terminal in common with said negative terminal of said first DC load bus;
   a first group of x alternator windings being connected to power said first DC load bus;
   a second group of n-x alternator windings being connected to power said second separate DC load bus;
   first diode means directly connecting the first and second ends of each of said x alternator windings in said first group to said first DC load bus for enabling a current flow in either direction in each of said x alternator windings to flow between said positive and negative terminals in the same direction;
   second diode means directly connecting the first and second ends of each of said second group of n-x alternator windings to said second separate DC load bus for enabling a current flow in either direction in each of said n-x alternator windings to flow between said second positive terminal and said common negative terminal in the same direction;
   a first switch coupled between said first and second groups of alternator windings, said first switch having a first closed position for coupling said first and second groups of alternator windings in series and a second open position for coupling said first group of alternator windings to said first DC load bus and said second group of alternator windings to said second DC load bus in parallel.

8. The switching alternator system of claim 7 further comprising:
   second switches having a first position for selectively connecting said first group of x alternator windings to said first DC load bus in serial and a second position for selectively connecting said first group of x alternator windings to said first DC load bus in parallel; and
   third switches having a first position for selectively connecting said second group of n-x alternator windings to said second separate DC load bus in series and a second position for selectively connecting said second group of n-x alternator windings to said second separate DC load in parallel.

9. The switching alternator system of claim 8 further comprising:
   an electronic control module connected to said first DC load bus;
   a battery connected to said second separate DC load bus for receiving a charging voltage;
   an RPM detector for generating a signal representing the rotational speed of said alternator; and
   said electronic control module being coupled to said RPM detector and to said first, second, and third switches for selectively closing said first, second, and third switches to connect all of said n alternator windings in series for supplying a first power to said first DC load bus when said alternator RPM is equal to or less than a first RPM and for opening said first switch to connect only said group of x alternator windings to said first DC load bus to supply a second different power to said first DC load bus and to connect said group of n-x alternator windings to said second separate DC load bus when said alternator RPM is greater than said first RPM but equal to or less than the second RPM.

10. The switching alternator system of claim 9 further comprising:
    said electronic control module, when opening said first switch, to connect only said n-x alternator windings to said second separate DC load bus, selectively opening said third switches to cause said n-x alternator windings to be coupled to said battery in parallel to obtain a first charging voltage and selectively closing said third switches to cause said n-x alternator windings to be coupled to said battery in series to obtain a second charging voltage.

11. The switching alternator system of claim 10 further comprising:
    a fourth switch connected in parallel between an end of at least one of said x alternator windings and the common ground bus under the control of said electronic control module to selectively conduct current to the common bus bar to regulate the voltage generated by said x alternator windings when said current flow through said x alternator windings is in a first direction; and
    a fifth switch connected in parallel between an end of at least another one of said alternator windings and said common ground bus under the control of said electronic control module to selectively conduct current to the common bus to regulate the voltage generated by said x alternator windings when said current flow generated by said x alternator windings is in the opposite direction.

12. The switching alternator system of claim 10 further comprising:
    a sixth switch connected in parallel between an end of at least one of said n-x alternator windings and the common ground bus under the control of said electronic control module to selectively conduct current to the common bus bar to regulate the voltage generated by said n-x alternator windings when said current flows through said n-x alternator windings is in a first direction; and
    a seventh switch connected in parallel between an end of at least another one of said n-x alternator windings and said common ground bus under the control of said electronic control module to selectively conduct current to the common ground bus to regulate the voltage generated by said n-x alternator windings when said current flow generated by said n-x alternator windings is in the opposite direction.

13. A switching alternator system comprising:
    first and second DC load buses providing positive and negative voltage terminals;
    a rotatable alternator having n alternator windings, each winding having first and second ends, for generating an AC voltage and a current flow alternating in first and second directions between said first and second ends;
    diode means separately connecting each of the first and second ends of each of said n windings directly to both said first and second DC load buses for enabling a current flow in either direction in each alternator winding to flow in the same direction between the first DC load bus and the second DC load bus;

switch means directly connecting opposite ends of each two electrically adjacent windings and having a first closed position for selectively and directly connecting said n alternator windings to each other in electrical series to supply a first current to the first and second DC load buses;

said switch means having a second open position for causing each of said alternator windings to be coupled directly to said DC load buses in parallel to supply a second different current to said first and second DC load buses, said switch means including a first switch, conductive in one direction only and selectively operable between opened and closed positions, connected between opposite ends of electrically adjacent windings to serially connect said n alternator windings to said DC load bus when a first current flows in the first direction through said first and second alternator windings to provide a half-waive rectified voltage; and a second switch, conductive only in a direction opposite said first switch and selectively operable between opened and closed positions, connected in parallel with said first switch to serially connect said n alternator windings to said DC load bus when a second current flows in the second direction through said alternator windings to provide a full-waive rectified DC voltage.

14. The switching alternator system of claim 13, wherein said first and second switches are both non-conductive simultaneously to connect said n alternator windings to said DC load bus in parallel.

* * * * *